US008730949B2

(12) United States Patent
Furutani

(10) Patent No.: US 8,730,949 B2
(45) Date of Patent: May 20, 2014

(54) PRIVATE BRANCH EXCHANGE, VOIP GATEWAY UNIT AND PRIVATE BRANCH EXCHANGE SYSTEM

(75) Inventor: Senichi Furutani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 456 days.

(21) Appl. No.: 13/026,627

(22) Filed: Feb. 14, 2011

(65) Prior Publication Data
US 2011/0200036 A1   Aug. 18, 2011

(30) Foreign Application Priority Data

Feb. 15, 2010   (JP) .................................... 2010-30127

(51) Int. Cl.
H04L 12/28   (2006.01)

(52) U.S. Cl.
USPC ........................................................ 370/352

(58) Field of Classification Search
USPC ........................................................ 370/352
See application file for complete search history.

(56) References Cited

U.S. PATENT DOCUMENTS

| 5,068,892 | A * | 11/1991 | Livanos | 379/112.01 |
| 7,848,506 | B1 * | 12/2010 | Infosino | 379/215.01 |
| 8,311,204 | B2 * | 11/2012 | Fotta | 379/210.02 |
| 2004/0213396 | A1 | 10/2004 | MacNamara et al. | |
| 2006/0291641 | A1 * | 12/2006 | Barclay et al. | 379/211.03 |
| 2007/0153770 | A1 | 7/2007 | Goyal et al. | |
| 2008/0265016 | A1 * | 10/2008 | Fitzgerald et al. | 235/378 |
| 2008/0298576 | A1 | 12/2008 | Tashiro et al. | |
| 2009/0061832 | A1 * | 3/2009 | Goggans et al. | 455/414.1 |
| 2011/0283349 | A1 * | 11/2011 | Wu | 726/11 |

FOREIGN PATENT DOCUMENTS

| JP | 2001-53884 A | 2/2001 |
| JP | 3390637 B2 | 3/2003 |
| JP | 2005-260456 A | 9/2005 |
| JP | 2006-41597 A | 2/2006 |
| JP | 2006-217256 A | 8/2006 |
| JP | 2008-60674 A | 3/2008 |
| JP | 2008-166941 A | 7/2008 |
| JP | 2008-294974 A | 12/2008 |
| JP | 4344292 B2 | 10/2009 |

OTHER PUBLICATIONS

Rohwer T., et al., "White Paper: Abwehr von Spam over Internet Telephony (SPIT-AL)", TNG, Internet Citation, Jan. 31, 2006, XP007902521, Retrieved from the Internet: URL:http://www.spit-abwehr.de/Whitepaper_SPITAL_20060310.pdf [retrieved on Jun. 15, 2007].
European Search Report dated May 25, 2011. (eight (8) pages).

* cited by examiner

Primary Examiner — Farah Faroul
(74) Attorney, Agent, or Firm — Crowell & Moring LLP

(57) ABSTRACT

This private branch exchange includes a park portion capable of parking a call put through to a telephone terminal unit via a terminal connection portion and a control portion controlling the park portion, when a nuisance call from the public telephone network is put through to the telephone terminal unit via the terminal connection portion, to park the nuisance call on the basis of a prescribed operation of the user against the nuisance call.

19 Claims, 4 Drawing Sheets

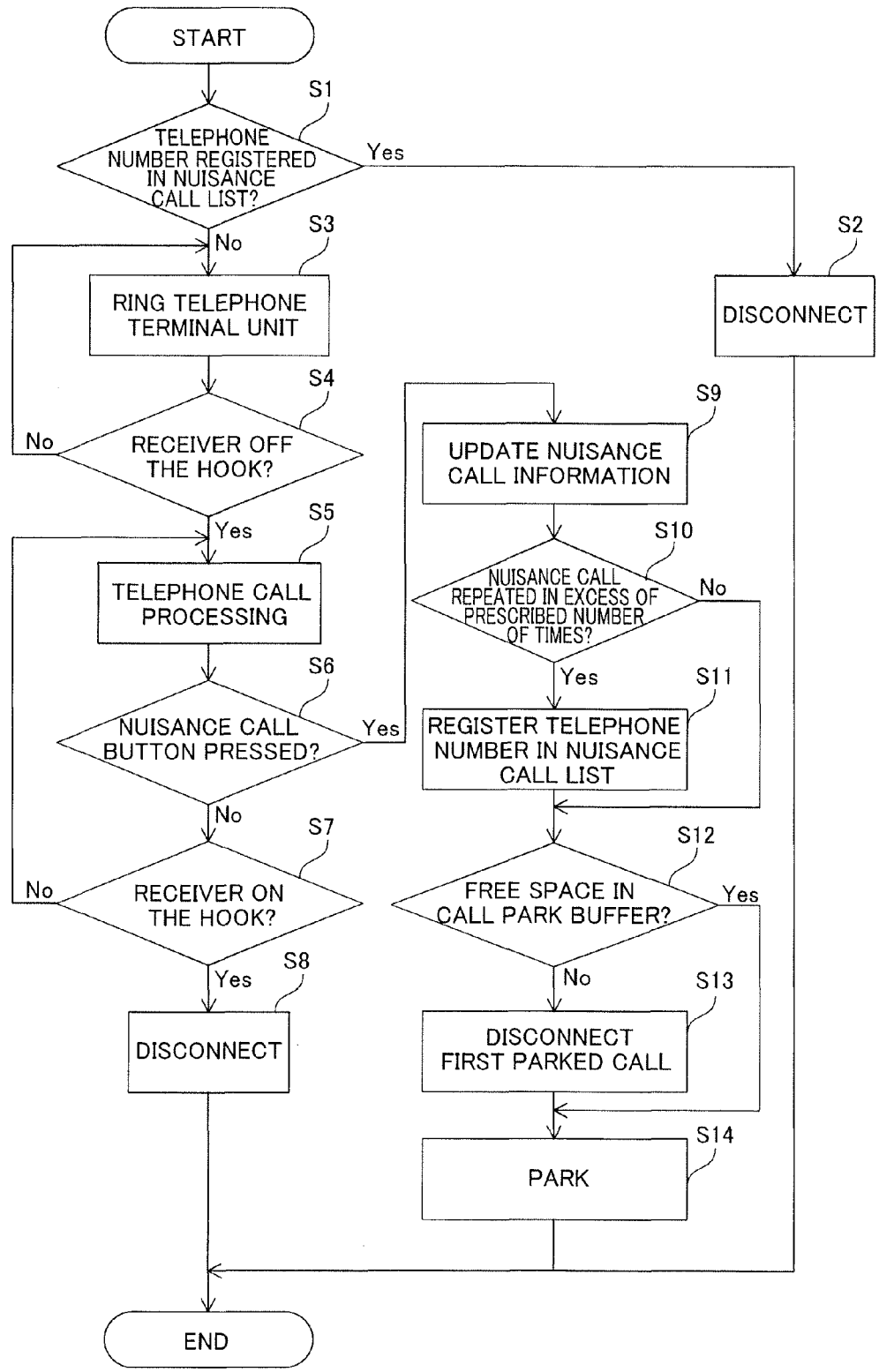

PRIVATE BRANCH EXCHANGE, VOIP GATEWAY UNIT AND PRIVATE BRANCH EXCHANGE SYSTEM

BACKGROUND OF THE INVENTION

1. Field of the Invention

The present invention relates to a private branch exchange, a VoIP gateway unit and a private branch exchange system, and more particularly, it relates to a private branch exchange, a VoIP gateway unit and a private branch exchange system each capable of coping with a nuisance call.

2. Description of the Background Art

An Internet telephone terminal unit capable of coping with a nuisance call is known in general, as disclosed in Japanese Patent Laying-Open No. 2005-260456, for example.

The aforementioned Japanese Patent Laying-Open No. 2005-260456 discloses an Internet telephone terminal unit writing information related to a caller making a call disconnected within a prescribed time from incoming in a filter table as the so-called one-ring call (nuisance call) (call disconnected after only short-time ringing) and not to drive a tone ringer for an incoming call received from the caller whose information is written in the filter table. Thus, the Internet telephone terminal unit is so formed as to cope with a one-ring call (nuisance call) by inhibiting a caller having ever made a one-ring call (nuisance call) from repeatedly making the one-ring call (nuisance call).

However, the Internet telephone terminal unit according to the aforementioned Japanese Patent Laying-Open No. 2005-260456, capable of coping with a one-ring call (nuisance call), cannot cope with a nuisance call put through thereto without being disconnected after only short-time ringing. A private branch exchange connecting a telephone terminal unit employed in a company or an office to a public telephone network, a VoIP gateway unit connecting a telephone terminal unit in an IP network to the public telephone network and a private branch exchange system including the private branch exchange and the VoIP gateway are known in general. When applied to the telephone terminal unit connected to the public telephone network through the private branch exchange or the VoIP gateway unit, the Internet telephone terminal unit according to the aforementioned Japanese Patent Laying-Open No. 2005-260456 cannot cope with the aforementioned nuisance call put through thereto without being disconnected after only short-time ringing.

SUMMARY OF THE INVENTION

The present invention has been proposed in order to solve the aforementioned problem, and an object of the present invention is to provide a private branch exchange, a VoIP gateway unit and a private branch exchange system each capable of coping with a nuisance call.

A private branch exchange according to a first aspect of the present invention includes a public telephone network connection portion communicatively connected to a public telephone network, a terminal connection portion communicatively connected to a telephone terminal unit, a park portion capable of parking a call put through to the telephone terminal unit via the terminal connection portion and a control portion controlling the park portion, when a nuisance call from the public telephone network is put through to the telephone terminal unit via the terminal connection portion, to park the nuisance call on the basis of a prescribed operation of the user against the nuisance call.

As hereinabove described, the private branch exchange according to the first aspect of the present invention is provided with the control portion controlling the park portion, when the nuisance call from the public telephone network is put through to the telephone terminal unit via the terminal connection portion, to park the nuisance call on the basis of the prescribed operation of the user against the nuisance call, whereby the park portion can park the nuisance call put through to the telephone terminal unit on the basis of the prescribed operation of the user against the nuisance call, so that the user may not respond to the nuisance call. Thus, the private branch exchange can cope with any nuisance call put through to the telephone terminal unit connected to the public telephone network via the private branch exchange.

The aforementioned private branch exchange according to the first aspect preferably further includes an information storage portion capable of storing information related to a caller making a call put through to the telephone terminal unit via the terminal connection portion, and the control portion is preferably so formed, when the nuisance call is put through to the telephone terminal unit, as to control the information storage portion to store information related to a caller making the nuisance call on the basis of the prescribed operation of the user. According to this structure, the private branch exchange can accumulate information related to the caller making the nuisance call in the information storage portion in addition to the operation of parking the nuisance call on the basis of the prescribed operation of the user against the nuisance call. Thus, the private branch exchange can more efficiently cope with a repeated nuisance call by disconnecting an incoming call received from the caller whose information is accumulated in the information storage portion without putting through the incoming call to the telephone terminal unit, for example.

In this case, the control portion is preferably so formed, when the nuisance call is put through to the telephone terminal unit, as to control the information storage portion to store the telephone number of the caller making the nuisance call as the information related to the caller making the nuisance call on the basis of the prescribed operation of the user. According to this structure, the information storage portion can easily accumulate the information related to the caller making the nuisance call by simply storing the telephone number of the caller making the nuisance call.

In the aforementioned structure including the information storage portion, the control portion is preferably so formed, when receiving an incoming call from a caller whose information has been stored in the information storage portion in excess of a prescribed number of times, as to perform a prescribed countermeasure operation without putting through the incoming call to the telephone terminal unit. According to this structure, the private branch exchange can effectively cope with a nuisance call repeatedly received from the same caller without burdening the user.

In the aforementioned structure having the control portion performing the prescribed countermeasure operation without putting through the incoming call to the telephone terminal unit, the private branch exchange preferably further includes a list storage portion storing a nuisance call list, and the control portion is preferably so formed as to control the list storage portion to register the caller whose information has been stored in the information storage portion in excess of the prescribed number of times in the nuisance call list and, when receiving an incoming call from the caller registered in the nuisance call list, as to disconnect the incoming call or as to transmit warning information to the caller making the nuisance call without putting through the incoming call to the telephone terminal unit. According to this structure, the private branch exchange can easily effectively cope with a nuisance call repeatedly received from the same caller without burdening the user, on the basis of the information registered in the nuisance call list.

In the aforementioned structure having the control portion disconnecting the incoming call or transmitting the warning information to the caller making the nuisance call, the control portion is preferably so formed, when receiving the incoming call from the caller registered in the nuisance call list, as to disconnect the incoming call or as to transmit the warning information to the caller making the nuisance call without ringing the telephone terminal unit. According to this structure, the telephone terminal set is not even rang for a nuisance call repeatedly received from the same caller, whereby the burden on the user can be reliably reduced.

The aforementioned private branch exchange according to the first aspect preferably further includes a list storage portion storing a nuisance call list, and the control portion is preferably so formed, when receiving an incoming call from a caller registered in the nuisance call list, as to perform a prescribed countermeasure operation without putting through the incoming call to the telephone terminal unit. According to this structure, the private branch exchange can easily treat an incoming call received from a prescribed caller as a nuisance call on the basis of the information registered in the nuisance call list.

In this case, the control portion is preferably so formed, when receiving the incoming call from the caller registered in the nuisance call list, as to disconnect the incoming call or as to transmit warning information to the caller making the nuisance call. According to this structure, the private branch exchange can effectively cope with the caller, registered in the information of the nuisance call list, making the nuisance call without burdening the user.

In the aforementioned structure including the list storage portion, the nuisance call list stored in the list storage portion is preferably so formed that the user can rewrite the contents thereof. According to this structure, the user can add or delete information to or from the nuisance call list, whereby the private branch exchange can cope with any nuisance call with the nuisance call list suitable to the user.

In the aforementioned private branch exchange according to the first aspect, the park portion is preferably formed to be capable of parking a prescribed number of calls, and the control portion is preferably so formed, when parking a newly received nuisance call in the park portion in a state where the park portion parks the prescribed number of calls, as to disconnect any one of the prescribed number of calls parked in the park portion and as to thereafter control the park portion to park the newly received nuisance call. According to this structure, the control portion can control the park portion to reliably park the newly received nuisance call by disconnecting any one of the parked calls even if the park portion has no free space, whereby the private branch exchange can reliably cope with the newly received nuisance call.

In this case, the control portion is preferably so formed, when parking the newly received nuisance call in the park portion in the state where the park portion parks the prescribed number of calls, as to disconnect the first parked call among the prescribed number of calls parked in the park portion and as to thereafter control the park portion to park the newly received nuisance call. According to this structure, the control portion can control the park portion to reliably park the newly received nuisance call by disconnecting the first parked call even if the park portion has no free space, whereby the private branch exchange can reliably cope with the newly received nuisance call.

In the aforementioned private branch exchange according to the first aspect, the prescribed operation of the user is preferably an operation of pressing a prescribed button of the telephone terminal unit. According to this structure, the user can reliably cope with any nuisance call by simply pressing the prescribed button of the telephone terminal unit.

In the aforementioned private branch exchange according to the first aspect, the control portion is preferably formed to be capable of continuously accepting the prescribed operation of the user after a call from the public telephone network is put through to the telephone terminal unit via the terminal connection portion until the call is disconnected. According to this structure, the user can cope with any nuisance call by performing the prescribed operation at any time as long as the call is made to the telephone terminal unit.

A VoIP gateway unit according to a second aspect of the present invention includes a public telephone network connection portion communicatively connected to a public telephone network, a terminal connection portion communicatively connected to a telephone terminal unit in an IP network, a signal conversion portion converting a voice signal so that the user can talk over the telephone terminal unit through the public telephone network, a park portion capable of parking a call put through to the telephone terminal unit via the terminal connection portion and a control portion controlling the park portion, when a nuisance call from the public telephone network is put through to the telephone terminal unit via the terminal connection portion, to park the nuisance call on the basis of a prescribed operation of the user against the nuisance call.

As hereinabove described, the VoIP gateway unit according to the second aspect of the present invention is provided with the control portion controlling the park portion, when the nuisance call from the public telephone network is put through to the telephone terminal unit in the IP network via the terminal connection portion, to park the nuisance call on the basis of the prescribed operation of the user against the nuisance call, whereby the park portion can park the nuisance call put through to the telephone terminal unit in the IP network on the basis of the prescribed operation of the user against the nuisance call, so that the user may not respond to the nuisance call. Thus, the VoIP gateway unit can cope with any nuisance call put through to the telephone terminal unit, connected to the public telephone network via the VoIP gateway unit, in the IP network.

The aforementioned VoIP gateway unit according to the second aspect preferably further includes an information storage portion capable of storing information related to a caller making a call put through to the telephone terminal unit via the terminal connection portion, and the control portion is preferably so formed, when the nuisance call is put through to the telephone terminal unit, as to control the information storage portion to store information related to a caller making the nuisance call on the basis of the prescribed operation of the user. According to this structure, the VoIP gateway unit can accumulate the information related to the caller making the nuisance call in the information storage portion in addition to the operation of parking the nuisance call on the basis of the prescribed operation of the user against the nuisance call. Thus, the VoIP gateway unit can more efficiently cope with a repeated nuisance call by disconnecting an incoming call received from the caller whose information is accumulated in the information storage portion without putting through the incoming call to the telephone terminal unit, for example.

In this case, the control portion is preferably so formed, when receiving an incoming call from a caller whose information has been stored in the information storage portion in excess of a prescribed number of times, as to perform a prescribed countermeasure operation without putting through the incoming call to the telephone terminal unit. According to this structure, the VoIP gateway unit can easily effectively cope with a nuisance call repeatedly received from the same caller without burdening the user.

In the aforementioned structure having the control portion performing the prescribed countermeasure operation without putting through the incoming call to the telephone terminal unit, the VoIP gateway unit preferably further includes a list storage portion storing a nuisance call list, and the control portion is preferably so formed as to control the list storage portion to register the caller whose information has been stored in the information storage portion in excess of the prescribed number of times and, when receiving an incoming call from the caller registered in the nuisance call list, as to disconnect the incoming call or as to transmit warning information to the caller making the nuisance call without putting through the incoming call to the telephone terminal unit. According to this structure, the VoIP gateway unit can easily effectively cope with a nuisance call repeatedly received from the same caller without burdening the user, on the basis of the information registered in the nuisance call list.

A private branch exchange system according to a third aspect of the present invention includes a telephone terminal unit allowing the user to perform a prescribed operation against a nuisance call and a private branch exchange, while the private branch exchange includes a public telephone network connection portion communicatively connected to a public telephone network, a terminal connection portion communicatively connected to the telephone terminal unit, a park portion capable of parking a call put through to the telephone terminal unit via the terminal connection portion, and a control portion controlling the park portion, when a nuisance call from the public telephone network is put through to the telephone terminal unit via the terminal connection portion, to park the nuisance call on the basis of the prescribed operation of the user, employing the telephone terminal unit, against the nuisance call.

In the private branch exchange system according to the third aspect of the present invention, as hereinabove described, the private branch exchange is provided with the control portion controlling the park portion, when the nuisance call from the public telephone network is put through to the telephone terminal unit via the terminal connection portion, to park the nuisance call on the basis of the prescribed operation of the user, employing the telephone terminal unit, against the nuisance call, whereby the private branch exchange system can park the nuisance call put through to the telephone terminal unit on the basis of the prescribed operation of the user, employing the telephone terminal unit, against the nuisance call so that the user may not respond to the nuisance call. Thus, the private branch exchange system can cope with any nuisance call put through to the telephone terminal unit connected to the public telephone network via the private branch exchange.

In the aforementioned private branch exchange system according to the third aspect, the private branch exchange preferably further includes an information storage portion capable of storing information related to a caller making a call put through to the telephone terminal unit via the terminal connection portion, and the control portion is preferably so formed, when the nuisance call is put through to the telephone terminal unit, as to control the information storage portion to store information related to a caller making the nuisance call on the basis of the prescribed operation of the user. According to this structure, the private branch exchange system can accumulate the information related to the caller making the nuisance call in the information storage portion in addition to the operation of parking the nuisance call on the basis of the prescribed operation of the user against the nuisance call. Thus, the private branch exchange system can more efficiently cope with a repeated nuisance call by disconnecting an incoming call received from the caller whose information is accumulated in the information storage portion without putting through the incoming call to the telephone terminal unit, for example.

In this case, the control portion is preferably so formed, when receiving an incoming call from a caller whose information has been stored in the information storage portion in excess of a prescribed number of times, as to perform a prescribed countermeasure operation without putting through the incoming call to the telephone terminal unit. According to this structure, the private branch exchange system can effectively cope with a nuisance call repeatedly received from the same caller without burdening the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flow chart for illustrating incoming call processing executed by the VoIP gateway unit of the private branch exchange system according to the embodiment of the present invention.

DESCRIPTION OF THE PREFERRED EMBODIMENTS

An embodiment of the present invention is now described with reference to the drawings.

Figure 1:
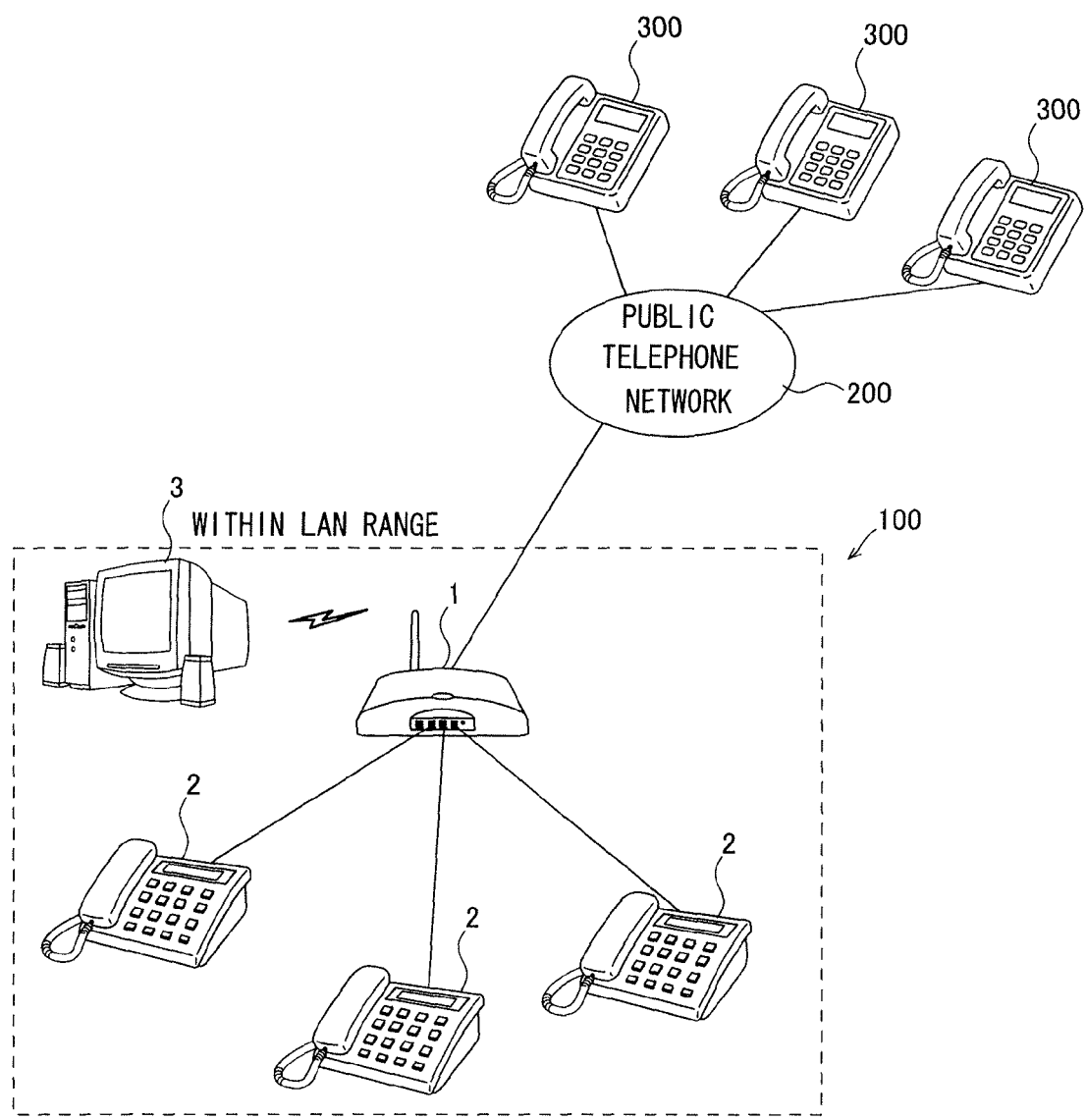
FIG. 1 is a schematic diagram showing the overall structure of a private branch exchange system according to an embodiment of the present invention.

First, the structure of a private branch exchange system 100 according to the embodiment of the present invention is described with reference to FIG. 1.

The private branch exchange system 100 according to the embodiment of the present invention includes a VoIP (Voice over Internet Protocol) gateway unit 1 and a plurality of telephone terminal units 2. A public telephone network 200 is connected to the VoIP gateway unit 1, while a plurality of telephone terminal units 300 are connected to the public telephone network 200. The VoIP gateway unit 1 is an example of the "private branch exchange" according to the present invention.

The VoIP gateway unit 1 has a function of relaying the public telephone network 200 and an IP network to each other. More specifically, the VoIP gateway unit 1 is so formed as to relay the public telephone network 200 to a LAN (Local Area Network) constructed in a company, an office or the like. Further, the VoIP gateway unit 1 functions as a PBX (Private Branch Exchange). In other words, the VoIP gateway unit 1 is so formed as to construct an extension telephone by connecting the telephone terminal units 2 in the company or the office with each other and as to connect the telephone terminal units 2 in the company or the office to the public telephone network 200.

Figure 2:
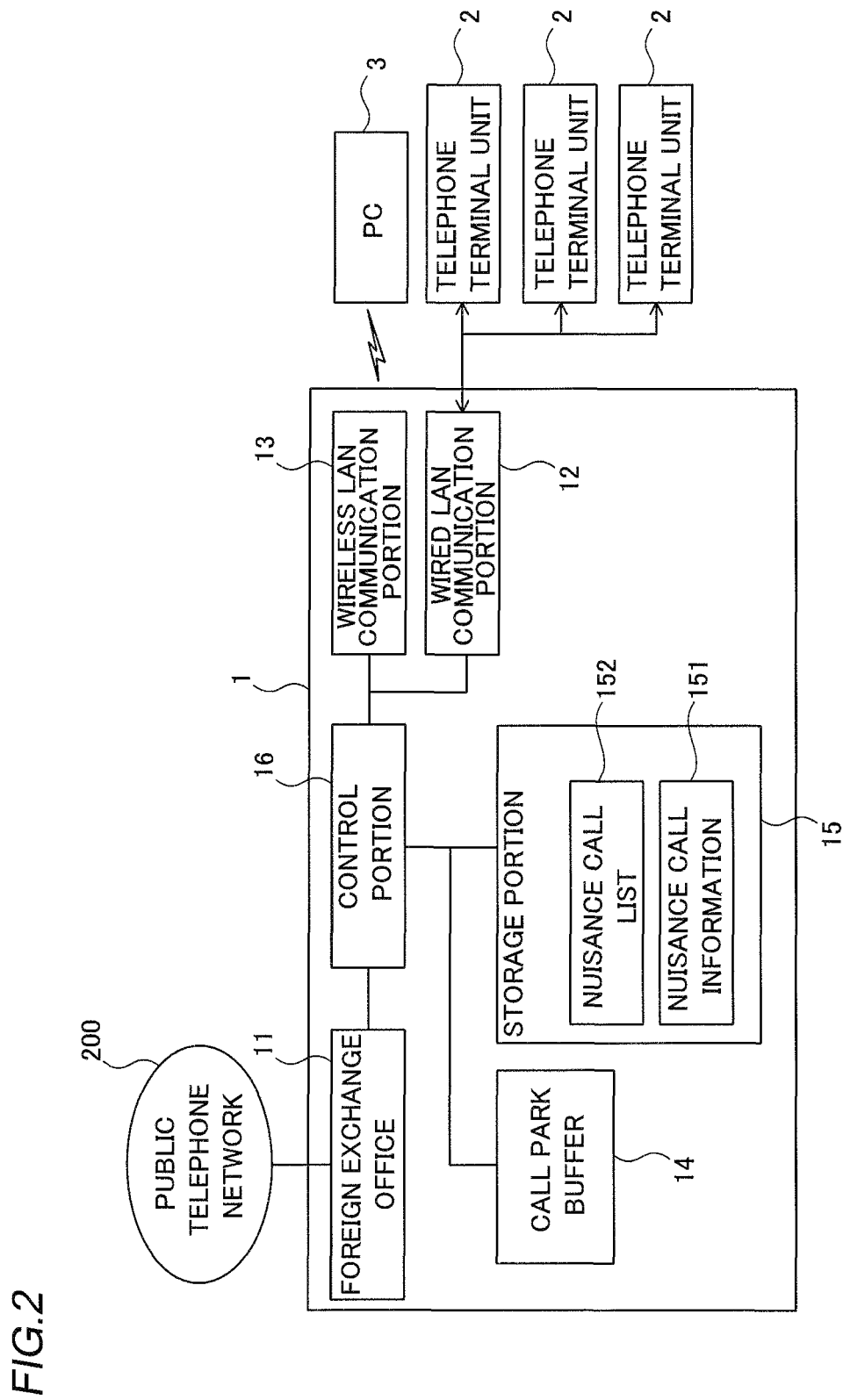
FIG. 2 is a block diagram showing a VoIP gateway unit of the private branch exchange system according to the embodiment of the present invention.

More specifically, the VoIP gateway unit 1 is mainly constituted of an FXO (Foreign Exchange Office) 11, a wired LAN communication portion 12, a wireless LAN communication portion 13, a call park buffer 14, a storage portion 15 and a control portion 16, as shown in FIG. 2.

The FXO 11 serves as an interface between the VoIP gateway unit 1 and the public telephone network 200, and is communicatively connected to the public telephone network 200. The FXO 11 is an example of the "public telephone network connection portion" in the present invention.

The plurality of telephone terminal units 2 are communicatively connected to the wired LAN communication portion 12 in a wired manner. The wired LAN communication portion 12 allows bidirectional communication between the VoIP gateway unit 1 and the telephone terminal units 2. A PC 3 is communicatively connected to the wired LAN communication portion 13 in a wired manner. The wired LAN communication portion 12 and the wireless LAN communication portion 13 are examples of the "terminal connection portion" in the present invention.

The call park buffer 14 is provided for parking a call put through to any of the telephone terminal units 2 via the FXO 11 and the wired LAN communication portion 12 in response to an instruction signal received from the control portion 16. The "call park" denotes a function of parking a call put through to a first telephone terminal unit 2 and thereafter canceling the parking through a second telephone terminal unit 2, different from the first telephone terminal unit 2, so that the user can talk over the first telephone terminal unit 2. The call park buffer 14 is formed to be capable of simultaneously parking a plurality of calls (five calls, for example). The call park buffer 14 is an example of the "park portion" in the present invention.

The storage portion 15 is formed by a rewritable nonvolatile memory such as a flash memory. The storage portion 15 stores nuisance call information 151 and a nuisance call list 152. The nuisance call information 151 accumulates the telephone numbers of callers (parties) making nuisance calls put through to each telephone terminal unit 2. More specifically, the nuisance call information 151 accumulates the telephone number of a caller (party) making a call currently put through to the telephone terminal unit 2 when the user presses a nuisance button (see FIG. 3) included in operation buttons 23, described later, of the telephone terminal unit 2. On the other hand, callers making nuisance calls to the telephone terminal unit 2 are registered in the nuisance call list 152. More specifically, telephone numbers accumulated in the nuisance call information 151 in excess of a prescribed number of times (three times, for example) are registered in the nuisance call list 152. The storage portion 15 is an example of the "information storage portion" or the "list storage portion" in the present invention.

The control portion 16 has a function of controlling the respective portions of the VoIP gateway unit 1. Further, the control portion 16 is so formed as to control the respective portions so that the VoIP gateway unit 1 functions as a relay between the public telephone network 200 and the IP network. More specifically, the control portion 16 converts analog voice signals received from the public telephone network 200 through the FXO 11 to digital voice signals, divides the converted digital voice signals into IP packets and transmits the same to the telephone terminal units 2. Further, the control portion 16 is so formed as to receive IP packets of digital voice signals from the telephone terminal units 2, as to restore the same to analog voice signals and as to transmit the restored analog voice signals to the public telephone network 200 through the FXO 11. The control portion 16 is an example of the "signal conversion portion" in the present invention.

In addition, the control portion 16 is so formed as to perform incoming call processing (see FIG. 4) described later by running a computer program (not shown) when receiving an incoming call from the public telephone network 200 through the FXO 11.

Figure 3:
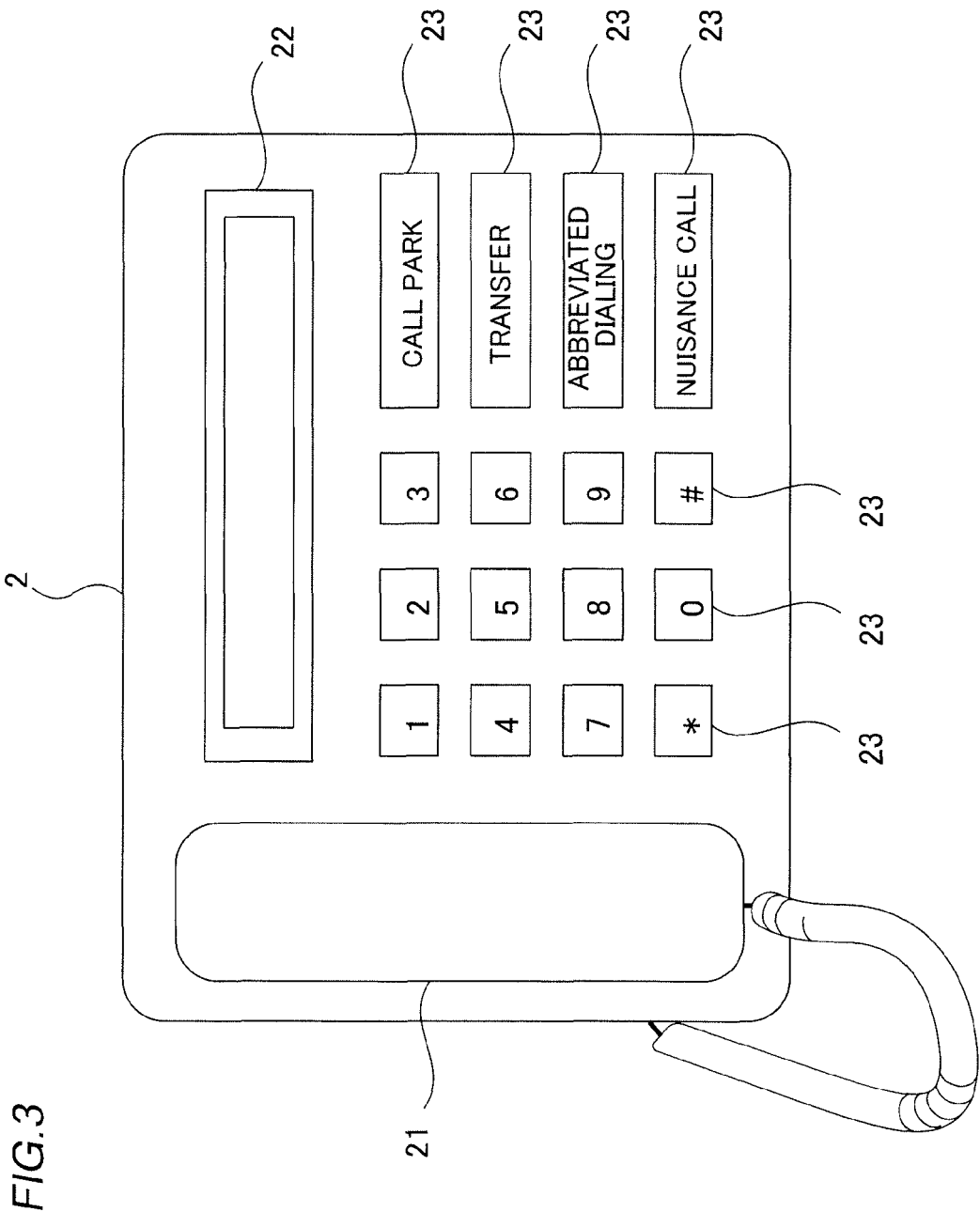
FIG. 3 is a plan view showing a telephone terminal unit of the private branch exchange system according to the embodiment of the present invention.

Each telephone terminal unit 2 has a receiver 21, a display portion 22 and the operation buttons 23, as shown in FIG. 3. The display portion 22 is so formed as to display the telephone number of a person with whom the user currently talks over the telephone terminal unit 2, the talking time and the like. The operation buttons 23 include a call park button, a transfer button, an abbreviated dialing button and the nuisance call button, in addition to number buttons of 0 to 9, an asterisk (*) button and a sharp (#) button. The user can park any call put through to the telephone terminal unit 2 as a nuisance call by pressing the nuisance call button while leaving the receiver 21 off the hook (holding the line).

The incoming call processing executed by the VoIP gateway unit 1 of the private branch exchange system 100 according to the embodiment of the present invention is now described with reference to FIG. 4. The control portion 16 of the VoIP gateway unit 1 executes the incoming call processing when receiving an incoming call from the public telephone network 200 through the FXO 11.

First, the control portion 16 determines whether or not the telephone number of the caller making the incoming call is registered in the nuisance call list 152 at a step S1 shown in FIG. 4. If the telephone number of the caller making the incoming call is registered in the nuisance call list 152, the control portion 16 disconnects the incoming call without putting through the same to the corresponding telephone terminal unit 2. Any telephone number registered in the nuisance call list 152 is that of a caller having made nuisance calls in excess of the prescribed number of times (three times, for example), as hereinabove described. Therefore, it is highly possible that any incoming call received from a caller whose telephone number has already been registered in the nuisance call list 152 is a nuisance call, and hence the control portion 16 disconnects the incoming call without putting through the same to the corresponding telephone terminal unit 2.

If the telephone number of the caller making the incoming call is not registered in the nuisance call list 152, on the other hand, the control portion 16 rings the telephone terminal unit 2 through the wired LAN communication portion 12. Thereafter the control portion 16 determines whether or not the user has took the receiver 21 of the telephone terminal unit 2 off the hook (ready to talk over the telephone terminal unit 2), and continuously rings the telephone terminal unit 2 until the user takes the receiver 21 off the hook.

When the user takes the receiver 21 off the hook, the control portion 16 executes telephone call processing at a step S5. More specifically, the control portion 16 converts an analog voice signal to a digital voice signal so that the user can talk over the telephone terminal unit 2 through the public telephone network 200. Further, the control portion 16 determines whether or not the user has pressed the nuisance call button of the telephone terminal unit 2 at a step 6. When the user presses the nuisance call button, the control portion 16 receives a prescribed signal from the telephone terminal unit 2 through the wired LAN communication portion 12. If the user does not press the nuisance call button, on the other hand, the control portion 16 determines whether or not the user has set the receiver 2 on the hook, and repeats the steps S5 to S7 until the user sets the receiver 2 on the hook. If the user sets the receiver 2 on the hook, the control portion 16 disconnects the telephone terminal unit 2 from the public telephone network 200 at a step S8.

According to this embodiment, the control portion 16 updates the nuisance call information 151 of the storage portion 15 at a step S9 if the user presses the nuisance call button at the step S6. More specifically, the control portion 16 stores the telephone number of the caller making the call currently put through to the telephone terminal unit 2 whose nuisance call button has been pressed in the nuisance call information 151. Then, the control portion 16 determines whether or not the nuisance call has been repeated in excess of the prescribed number of times (three times, for example) at a step S10. In other words, the control portion 16 determines whether or not the telephone number of the caller currently making the call has been accumulated in excess of the prescribed number of times (three times, for example) on the basis of the nuisance call information 151. If the telephone number has been accumulated in the nuisance call information 151 in excess of the prescribed number of times (three times, for example), the control portion 16 registers the telephone number accumulated in excess of the prescribed number of times in the nuisance call list 152 of the storage portion 15 at a step S11. If the telephone number has not yet been accumulated in the nuisance call information 15 in excess of the prescribed number of times, on the other hand, the control portion 16 advances to a step S12 without registering the telephone number in the nuisance call list 152.

At the step S12, the control portion 16 determines whether or not the call park buffer 14 has a free space. If the number of calls currently parked in the call park buffer 14 corresponds to the upper limit (five, for example), the control portion 16 determines that the call park buffer 14 has no free space, and advances to a step S13. At the step S13, the control portion 16 disconnects the first parked call among those parked in the call park buffer 14. Thereafter the control portion 16 parks the call (nuisance call) for which the user has pressed the nuisance call button at a step S14. The control portion 16 executes the incoming call processing in the aforementioned manner.

According to this embodiment, as hereinabove described, the VoIP gateway unit 1 is provided with the control portion 16 controlling the call park buffer 14 to park a nuisance call on the basis of the operation of the user pressing the nuisance call button of the telephone terminal unit 2 when the nuisance call from the public telephone network 200 is put through to the telephone terminal unit 2 via the wired LAN communication portion 12, whereby the user can park the nuisance call put through to the telephone terminal unit 2 by pressing the nuisance call button of the telephone terminal unit 2, so that he/she may not respond to the nuisance call. Thus, the private branch exchange system 100 can cope with any nuisance call put through to any telephone terminal unit 2 connected to the public telephone network 200 through the VoIP gateway unit 1. Further, the user can easily cope with any nuisance call by simply pressing the nuisance call button of the telephone terminal unit 2.

According to this embodiment, the control portion 16 is so formed as to control the storage portion 15 to store the telephone number of any caller making a nuisance call on the basis of the operation of the user pressing the nuisance call button when the nuisance call is put through to the telephone terminal unit 2, whereby the telephone number of the caller making the nuisance call can be accumulated in the nuisance call information 151 of the storage portion 15 on the basis of the operation of the user pressing the nuisance call button.

According to this embodiment, the control portion 16 is so formed as to register any caller, whose telephone number has been accumulated in the nuisance call information 151 in excess of the prescribed number of times (three times, for example), in the nuisance call list 152 and, when receiving an incoming call from any caller registered in the nuisance call list 152, as to disconnect the incoming call without putting through the same to the corresponding telephone terminal unit 2, whereby the private branch exchange system 100 can effectively cope with a nuisance call repeatedly received from the same caller on the basis of information registered in the nuisance call list 152, without burdening the user.

According to this embodiment, the control portion 16 is so formed, when parking a newly received nuisance call in the call park buffer 14 having no free space, as to park the newly received nuisance call after disconnecting the first parked call so that the newly received nuisance call can be reliably parked by disconnecting the first parked call if the call park buffer 14 has no free space, whereby the private branch exchange system 100 can reliably cope with the newly received nuisance call.

According to this embodiment, the control portion 16 is so formed, when receiving an incoming call from any caller registered in the nuisance call list 152, as to disconnect the incoming call without ringing the telephone terminal unit 2 so that the telephone terminal unit 2 is not even rang for a nuisance call repeatedly received from the same caller, whereby the burden on the user can be reliably reduced.

According to this embodiment, the control portion 16 is formed to be capable of continuously accepting the operation of the user pressing the nuisance call button of the telephone terminal unit 2 until any call from the public telephone network 200 is disconnected after the same is put through to the telephone terminal unit 2, whereby the user can cope with any nuisance call by pressing the nuisance call button at any time as long as the call is made to the telephone terminal unit 2.

Although the present invention has been described and illustrated in detail, it is clearly understood that the same is by way of illustration and example only and is not to be taken by way of limitation, the spirit and scope of the present invention being limited only by the terms of the appended claims.

For example, while the VoIP gateway unit is employed as an exemplary private branch exchange in the aforementioned embodiment, the present invention is not restricted to this. The present invention is also applicable to another private branch exchange other than the VoIP gateway unit.

While each telephone terminal unit 2 having the receiver 21 is employed as an exemplary telephone terminal unit in the aforementioned embodiment, the present invention is not restricted to this. According to the present invention, the PC 3 connected to the wired LAN communication portion 13 may alternatively be employed as the telephone terminal unit, for example.

While the operation of pressing the nuisance call button of the telephone terminal unit is employed as an exemplary prescribed operation of the user for coping with a nuisance call in the aforementioned embodiment, the present invention is not restricted to this. According to the present invention, the user may alternatively press the sharp (#) button and a prescribed number button in combination with each other, or may press a prescribed button for a long time (at least 3 seconds, for example), for example, as the prescribed operation for coping with a nuisance call. In this case, the telephone terminal unit may not be provided with a dedicated button such as the nuisance call button.

While the telephone number of the caller is accumulated as exemplary information related to the caller making a nuisance call on the basis of the prescribed operation (operation pressing the nuisance call button) of the user in the aforementioned embodiment, the present invention is not restricted to this. According to the present invention, information related to the area of the caller making a nuisance call or information related to the provider for the caller making a nuisance call may alternatively be accumulated as the information related to the caller making the nuisance call.

While the control portion is so formed, when receiving an incoming call from any caller registered in the nuisance call list, as to disconnect the incoming call without putting through the same to the telephone terminal unit in the aforementioned embodiment, the present invention is not restricted to this. According to the present invention, the control portion may alternatively be so formed, when receiving an incoming call from any caller registered in the nuisance call list, as to transmit warning information to the caller making the nuisance call. In this case, the control portion may transmit the warning information to the caller without putting through the incoming call to the telephone terminal unit. Thus, the user of the telephone terminal unit may not respond to any call received from the caller registered in the nuisance call list. Further alternatively, the control portion may be so formed, when receiving an incoming call from any caller registered in the nuisance call list, as to execute an operation other than that disconnecting the incoming call or transmitting the warning information.

While the caller whose telephone number is accumulated in the nuisance call information in excess of the prescribed number of times (three times, for example) is registered in the nuisance call list in the aforementioned embodiment, the present invention is not restricted to this. According to the present invention, the private branch exchange system 100 may alternatively be so formed that the user can manually register a prescribed caller in the nuisance call list 152 of the storage portion 15 with the PC 3 connected to the wired LAN communication portion 13, regardless of the number of times by which the telephone number of the caller has been accumulated in the nuisance call information 151. In this case, the user may register the caller through a Web application screen displayed on a display portion of the PC 3. Further alternatively, the private branch exchange system 100 may be so formed that the user can arbitrarily delete information related to a prescribed caller from the nuisance call list 152 of the storage portion 15 with the PC 3. Thus, the user can add or delete information to or from the nuisance call list 152, whereby the private branch exchange system 100 can cope with any nuisance call with the nuisance call list 152 suitable to the user.

While the private branch exchange system 100 is so formed as to register the caller whose telephone number has been accumulated in the nuisance call information 151 in excess of three times in the nuisance call list 152 in the aforementioned embodiment, the present invention is not restricted to this. According to the present invention, the private branch exchange system 100 may alternatively be so formed as to register any caller whose telephone number has been recorded in the nuisance call information only once or at least twice or four times in the nuisance call list.

While the control portion is so formed, when parking a newly received nuisance call, as to disconnect the first parked call if the call park buffer serving as a park portion has no free space in the aforementioned embodiment, the present invention is not restricted to this. According to the present invention, the control portion may alternatively be so formed, when parking a newly received nuisance call in the call park buffer having no free space, that the user can arbitrarily select a call to be disconnected.

What is claimed is:

1. A private branch exchange comprising:
   a public telephone network connection portion communicatively connected to a public telephone network;
   a terminal connection portion communicatively connected to a first telephone terminal unit;
   a park portion configured to park a call put through to said first telephone terminal unit via said terminal connection portion;
   a control portion controlling said park portion, when a nuisance call from said public telephone network is put through to said first telephone terminal unit via said terminal connection portion, to park said nuisance call on the basis of a prescribed operation of a user against said nuisance call, and parking a call put through to the first telephone terminal unit and thereafter canceling the parking through a second telephone terminal unit, different from the first telephone terminal unit, the control portion allowing the user to talk over the second telephone terminal unit, wherein
   said park portion is configured to park a prescribed number of calls, and
   said control portion is configured, when parking a newly received nuisance call in said park portion in a state where said park portion parks said prescribed number of calls, to disconnect any one of said prescribed number of calls parked in said park portion and to thereafter control said park portion to park said newly received nuisance call.

2. The private branch exchange according to claim 1, further comprising an information storage portion configured to store information related to a caller making a call put through to said telephone terminal unit via said terminal connection portion, wherein
   said control portion is configured, when said nuisance call is put through to said telephone terminal unit, to control said information storage portion to store information related to a caller making said nuisance call on the basis of said prescribed operation of the user.

3. The private branch exchange according to claim 2, wherein
   said control portion is configured, when said nuisance call is put through to said telephone terminal unit, to control said information storage portion to store the telephone number of said caller making said nuisance call as said information related to said caller making said nuisance call on the basis of said prescribed operation of the user.

4. The private branch exchange according to claim 2, wherein
   said control portion is configured, when receiving an incoming call from a caller whose said information has been stored in said information storage portion in excess of a prescribed number of times, to perform a prescribed countermeasure operation without putting through said incoming call to said telephone terminal unit.

5. The private branch exchange according to claim 4, further comprising a list storage portion storing a nuisance call list, wherein
   said control portion is configured to control said list storage portion to register said caller whose said information has been stored in said information storage portion in excess of said prescribed number of times in said nuisance call list and, when receiving an incoming call from said caller registered in said nuisance call list, to disconnect said incoming call or to transmit warning information to said caller making said nuisance call without putting through said incoming call to said telephone terminal unit.

6. The private branch exchange according to claim 5, wherein
said control portion is configured, when receiving said incoming call from said caller registered in said nuisance call list, to disconnect said incoming call or to transmit said warning information to said caller making said nuisance call without ringing said telephone terminal unit.

7. The private branch exchange according to claim 1, further comprising a list storage portion storing a nuisance call list, wherein
said control portion is configured, when receiving an incoming call from a caller registered in said nuisance call list, to perform a prescribed countermeasure operation without putting through said incoming call to said telephone terminal unit.

8. The private branch exchange according to claim 7, wherein
said control portion is configured, when receiving said incoming call from said caller registered in said nuisance call list, to disconnect said incoming call or to transmit warning information to said caller making said nuisance call without putting through said incoming call to said telephone terminal unit.

9. The private branch exchange according to claim 7, wherein
said nuisance call list stored in said list storage portion is configured to allow the user to rewrite the contents thereof.

10. The private branch exchange according to claim 1, wherein
said control portion is configured, when parking said newly received nuisance call in said park portion in said state where said park portion parks said prescribed number of calls, to disconnect the first parked call among said prescribed number of calls parked in said park portion and to thereafter control said park portion to park said newly received nuisance call.

11. The private branch exchange according to claim 1, wherein
said prescribed operation of the user is an operation of pressing a prescribed button of said telephone terminal unit.

12. The private branch exchange according to claim 1, wherein
said control portion is configured to continuously accept said prescribed operation of the user after a call from said public telephone network is put through to said telephone terminal unit via said terminal connection portion until said call is disconnected.

13. A VoIP gateway unit comprising:
a public telephone network connection portion communicatively connected to a public telephone network;
a terminal connection portion communicatively connected to a first telephone terminal unit in an IP network;
a signal conversion portion converting a voice signal a user can talk over said first telephone terminal unit through said public telephone network;
a park portion configured to park a call put through to said first telephone terminal unit via said terminal connection portion;
a control portion controlling said park portion, when a nuisance call from said public telephone network is put through to said first telephone terminal unit via said terminal connection portion, to park said nuisance call on the basis of a prescribed operation of the user against said nuisance call, and parking a call put through to the first telephone terminal unit and thereafter canceling the parking through a second telephone terminal unit, different from the first telephone terminal unit, the control portion allowing the user to talk over the second telephone terminal unit, wherein
said park portion is configured to park a prescribed number of calls, and
said control portion is configured, when parking a newly received nuisance call in said park portion in a state where said park portion parks said prescribed number of calls, to disconnect any one of said prescribed number of calls parked in said park portion and to thereafter control said park portion to park said newly received nuisance call.

14. The VoIP gateway unit according to claim 13, further comprising an information storage portion configured to store information related to a caller making a call put through to said telephone terminal unit via said terminal connection portion, wherein
said control portion is configured, when said nuisance call is put through to said telephone terminal unit, to control said information storage portion to store information related to a caller making said nuisance call on the basis of said prescribed operation of the user.

15. The VoIP gateway unit according to claim 14, wherein
said control portion is configured, when receiving an incoming call from a caller whose said information has been stored in said information storage portion in excess of a prescribed number of times, to perform a prescribed countermeasure operation without putting through said incoming call to said telephone terminal unit.

16. The VoIP gateway unit according to claim 15, further comprising a list storage portion storing a nuisance call list, wherein
said control portion is configured to control said list storage portion to register said caller whose information has been stored in said information storage portion in excess of said prescribed number of times in said nuisance call list and, when receiving an incoming call from said caller registered in said nuisance call list, to disconnect said incoming call or to transmit warning information to said caller making said nuisance call without putting through said incoming call to said telephone terminal unit.

17. A private branch exchange system comprising:
a first telephone terminal unit allowing the user to perform a prescribed operation against a nuisance call; and
a private branch exchange, wherein
said private branch exchange includes a public telephone network connection portion communicatively connected to a public telephone network, a terminal connection portion communicatively connected to said first telephone terminal unit, a park portion configured to park a call put through to said first telephone terminal unit via said terminal connection portion, and a control portion controlling said park portion, when a nuisance call from said public telephone network is put through to said first telephone terminal unit via said terminal connection portion, to park said nuisance call on the basis of said prescribed operation of a user, employing said first telephone terminal unit, against said nuisance call, and parking a call put through to the first telephone terminal unit and thereafter canceling the parking through a second telephone terminal unit, different from the first telephone terminal unit, the control portion allowing the user to talk over the second telephone terminal unit, wherein said park portion is configured to park a prescribed number of calls, and said control portion is configured, when parking a newly received nuisance call in said park portion in a state where said park portion parks said prescribed number of calls, to disconnect any one of said prescribed number of calls parked in said park portion and to thereafter control said park portion to park said newly received nuisance call.

18. The private branch exchange system according to claim 17, wherein said private branch exchange further includes an information storage portion configured to store information related to a caller making a call put through to said telephone terminal unit via said terminal connection portion, and said control portion is configured, when said nuisance call is put through to said telephone terminal unit, to control said information storage portion to store information related to a caller making said nuisance call on the basis of said prescribed operation of the user.

19. The private branch exchange system according to claim 18, wherein said control portion is configured, when receiving an incoming call from a caller whose said information has been stored in said information storage portion in excess of a prescribed number of times, to perform a prescribed countermeasure operation without putting through said incoming call to said telephone terminal unit.

* * * * *